United States Patent [19]

Bewsher

[11] Patent Number: 5,523,889
[45] Date of Patent: Jun. 4, 1996

[54] BEAM EXPANDING LENS

[75] Inventor: Amanda Bewsher, Gloucester, Canada

[73] Assignee: National Research Council of Canada, Ottawa, Canada

[21] Appl. No.: 242,863

[22] Filed: May 16, 1994

[51] Int. Cl.$^6$ .................................................. G02B 3/06
[52] U.S. Cl. ........................... 359/710; 359/625; 359/831
[58] Field of Search ........................... 359/708, 710, 359/719, 720, 668, 671, 619, 620, 621, 622, 623, 624, 625, 626, 669, 833, 834, 837

[56] References Cited

U.S. PATENT DOCUMENTS

| | | | |
|---|---|---|---|
| 3,535,025 | 10/1970 | Shannon | 359/837 |
| 4,826,299 | 5/1989 | Powell | 350/432 |
| 5,123,722 | 6/1992 | Meymand | 359/592 |

Primary Examiner—Georgia Y. Epps
Assistant Examiner—Dawn-Marie Bey
Attorney, Agent, or Firm—Juliusz Szereszewski

[57] ABSTRACT

A new type of optical element for diverging a laser beam in several directions, for example to produce a relatively uniform cross, has a number of cylindrical segments. Each segment has at least two surfaces, a primary and a secondary surface. The primary surface has a relatively sharp apex and is shaped to conform to a curve defined in a (x,y,z) cartesian coordinate system by the equation $$z = \frac{cy^2}{1 + \sqrt{1 - (1+Q)c^2y^2}}$$

where z and y are independent of x, c is the curvature at the apex and Q is the conic constant which is less than −1.

The element is useful e.g. for precision alignment.

12 Claims, 7 Drawing Sheets

Plot Area: 500×500 mm
Throughput 100%
Maximum Intensity 94.0

Plot Area: 500×500 mm
Throughput 100%
Maximum Intensity 42.9

BEAM EXPANDING LENS

FIELD OF THE INVENTION

This invention relates to optical elements e.g. lenses for expanding beams, especially for use as laser beam expanders, and in particular to a single optical element which consists of a number of segments each resembling a prism with a relatively small radius at its apex and having a primary surface which can be described by a one-dimensional conic.

BACKGROUND OF THE INVENTION

The machine vision industry commonly employs laser beam projection systems for precision alignment and for determining the three dimensional shape of objects. A pattern of laser lines is projected onto the object and the resulting beam deflections are used to determine the surface profile. A laser beam can easily be expanded into a line by attaching a cylindrical lens onto the front of the laser, however, expanding a typically gaussian laser beam into a series of lines results in a gaussian intensity distribution along the projected lines. This results in thresholding problems for the silicon detectors commonly used.

U.S. Pat. No. 4,826,299 to Powell describes a single optical element which projects a uniform intensity laser line, and this, in combination with a diffraction grating can be used to project a grid of such lines.

While the Powell element is useful, in order to obtain more information about the object under test it is preferable to project the laser beams in at least two intersecting directions. For these applications, and also for precision alignment purposes, a laser cross is desirable. Methods commonly used to achieve a cross-shaped beam distribution include using lenses to image the laser beam onto a mask, thus throwing away much of the light. These systems, however, are complex and also suffer from non-uniformity along the length of the projected lines.

OBJECTS OF THE INVENTION

It is an object of the present invention to provide a new lens for expanding beams, particularly laser beams.

It is a further object of the present invention to provide a new lens which can expand a laser beam into a uniform cross or another star-like, or multi-arm, shape.

SUMMARY OF THE INVENTION

Briefly stated, an optical element of the present invention comprises a plurality (preferably, but not necessarily four) of cylindrical segments joined together so that their cylindrical axes intersect forming a substantially uniform star-like, or partly star-like, arrangement in a single plane. Each segment has at least two surfaces, a primary and a secondary surface. The primary surface has a relatively sharp apex and is shaped to conform to a curve defined in a (x,y,z) cartesian coordinate system by the equation $$z = \frac{cy^2}{1 + \sqrt{1 - (1+Q)c^2y^2}}$$

where z and y are independent of x, c is the curvature at the apex and Q is the conic constant which is less than −1.

The definition "relatively sharp" denotes a small radius of curvature and is explained in the following disclosure. It is identical as in the U.S. Pat. No. 4,826,299.

The intersection of the apices defines a vertex. When the optical element is used as a beam projector, also known as expander, the beam should be directed at the vertex to achieve a proper distribution (expansion) of the resulting optical lines.

The optical elements of the invention are most effective for expanding laser beams, but can also be used in conjunction with other narrow parallel beams.

BRIEF DESCRIPTION OF THE DRAWINGS

For more complete understanding of the present invention, references may now be made to the following description taken in conjunction with the accompanying drawings in which:

FIG. 9b is a plan view of the element of FIG. 9a.

DETAILED DESCRIPTION OF THE PRESENT INVENTION

Figure 1:
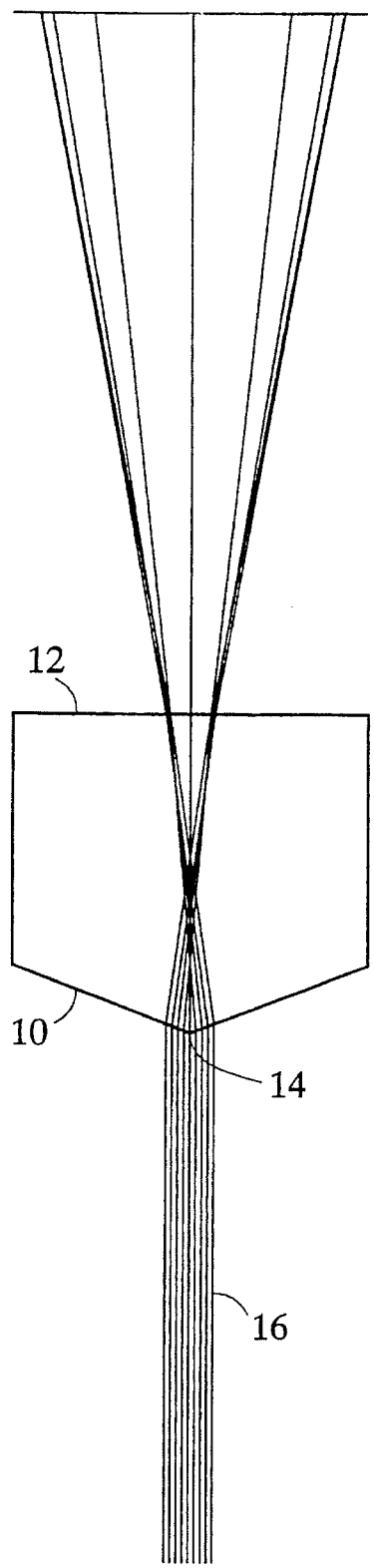
FIG. 1 shows the prior art laser beam line expander of the U.S. Pat. No. 4,826,299.

FIG. 1 shows a prior art laser beam line expander employing a single two-dimensional optical element, a cylindrical lens having two surfaces, namely a primary surface 10 and a secondary surface 12. The primary surface has an apex 14 and is shaped so as to cause the centre portion of the laser beam 16 to diverge more rapidly than at the edges, thus producing a more uniform intensity of the resulting line. The surface shape which gives rise to this effect has a small radius of curvature at the apex 14 and a relatively large conic constant. This results in the centre (most intense) portion of the laser beam seeing the small radius of curvature and thus undergoing a greater divergence than the outer edges of the beam which, in a typically gaussian laser beam, are naturally less intense. The shape of the primary surface 10 is described by the two-dimensional expression in the (x,y,z) cartesian coordinate system $$z = \frac{cy^2}{1 + \sqrt{1 - (1+Q)c^2y^2}}$$

where y and z are independent of x, c is the curvature at the apex and 0 is the conic constant.

The secondary surface merely increases the divergence of the laser line and does not affect its uniformity. It can be either planar (flat) or negative cylindrical.

Figure 2A:
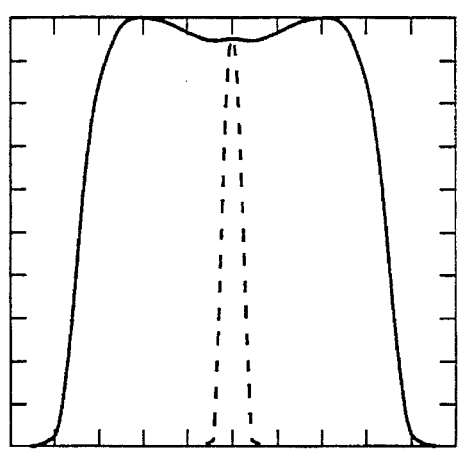
FIG. 2a is a graph showing a profile plot of the beam expanded by the line expander of FIG. 1.
Figure 2B:
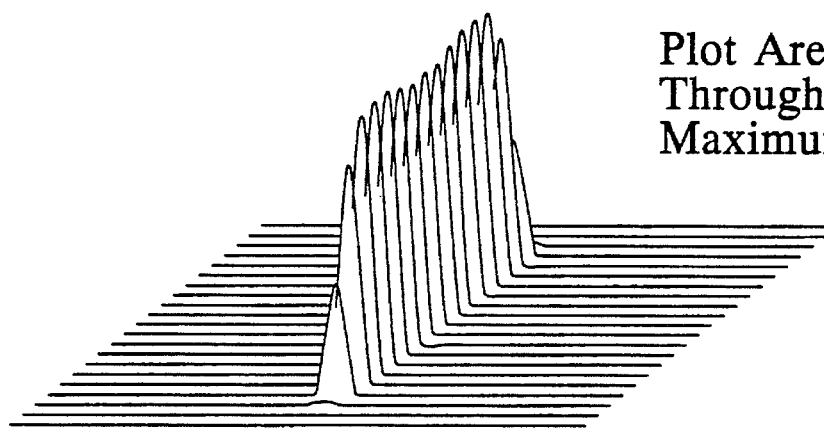
FIG. 2b is an isometric plot of the beam of the line expander of FIG. 1.

The intensity distribution of such an expanded beam having a divergence of 20°, at a distance of 1 m from the lens is shown in FIGS. 2a and 2b. FIG. 2a shows a profile plot, and FIG. 2b, an isometric plot of the beam expanded by the prior art optical element. The contour of the expanded beam is linear of a relatively good uniformity. The plot area, throughput and maximum intensity are also indicated in the FIG. 2.

It has been confirmed in tests that a uniform diverging cross, or another star-like optical figure, can be projected by combining a number of segments, each of which being based on the above-described prior art cylindrical lens. Each segment produces a line of uniform intensity and therefore by combining for example four of these cylindrical elements in the arrangement shown in FIG. 3, it is possible to produce a lens which can expand a laser beam into a diverging cross of uniform intensity. For a given lens material and refractive index, the amount of divergence of the cross and its uniformity depends on the radius of curvature and the conic constant of the quadrants.

Figure 3:
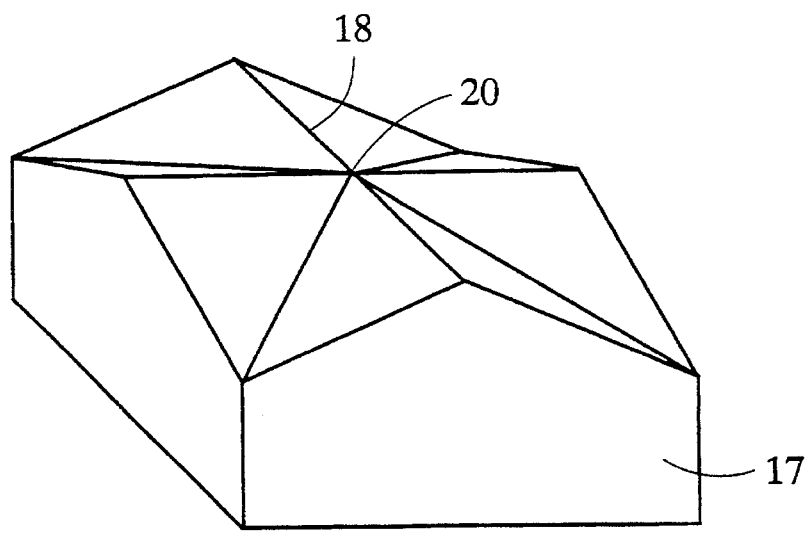
FIG. 3 is an oblique view of an embodiment of the lens of the present invention.

In FIG. 3, four cylindrical optical segments 17 are cemented together so that their apices 18 form a uniform cross with a vertex 20 at the intersection of the apices.

Figure 4A:
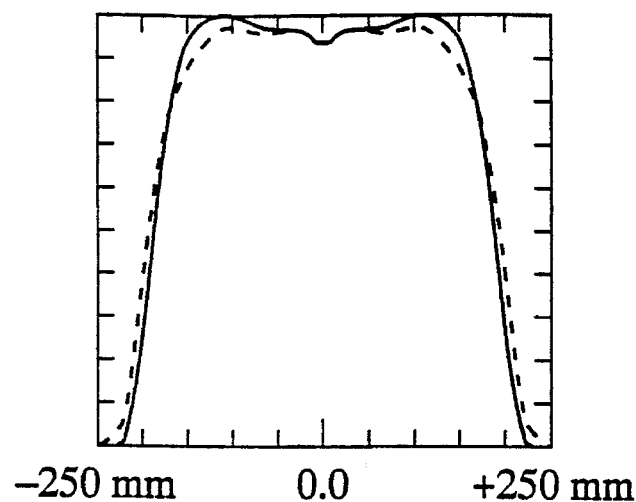
FIG. 4a illustrates a profile plot of the expanded cross-shaped beam produced by the expander of FIG. 3.
Figure 4B:
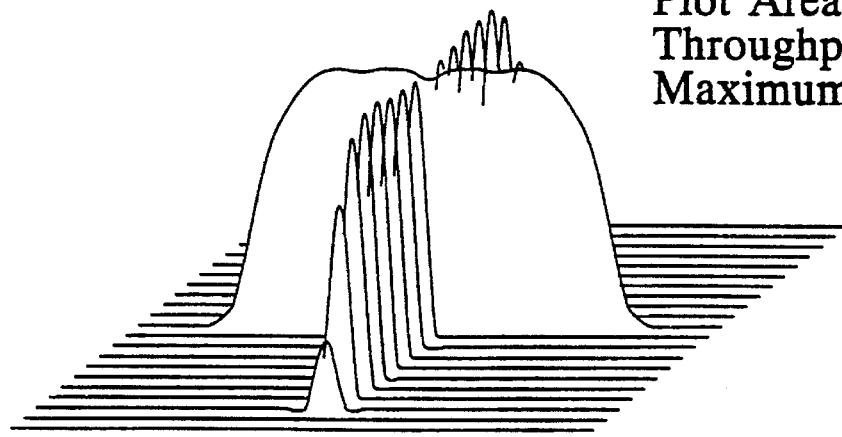
FIG. 4b illustrates an isometric plot of the of the beam produced by the expander of FIG. 3.

In a test conducted to validate the invention, a typical He-Ne laser, having a natural beam divergence of 0.8 mm at $1/e^2$ of the maximum intensity was aligned with the centre of the element of FIG. 3 (meeting the primary surface first) so that each quadrant received a quarter of the light. By mounting four of the cylindrical quadrants with their axes at right angles to the others, half the light is spread into a horizontal line and the other half into a vertical line. The intensity distribution of such an element, having a refractive index of 1.52 (glass type BK7), a radius of curvature of 0.63 mm and a conic constant of −7 is shown in FIGS. 4a and 4b, where FIG. 4a describes the profile plot, the solid line corresponding to the axis in the plane of the drawing and the broken line corresponding to the other axis; and FIG. 4b illustrates isometric plot of the expanded cross-shaped beam. The plot area, throughput and maximum intensity are indicated in FIGS. 4a and 4b. The cross has a 20° divergence.

In another test, the optical element consisted of four segments each having a refractive index of 1.52 (BK7), a radius of curvature of 2.7 mm and a conic constant of −125. The laser and the optical arrangement was as in the first test. The resulting cross had a 5° divergence.

Other theoretically acceptable exemplary shapes of the primary surfaces of the segments of the optical element of the present invention are indicated in FIG. 16 of U.S. Pat. No. 4,826,299 the specification of which is incorporated by reference.

The alignment of the quadrants, in the case of a cross, is critical as any angular misalignment between the two opposite cylindrical axes can create a double vision effect instead of a clean cross.

Figure 5:
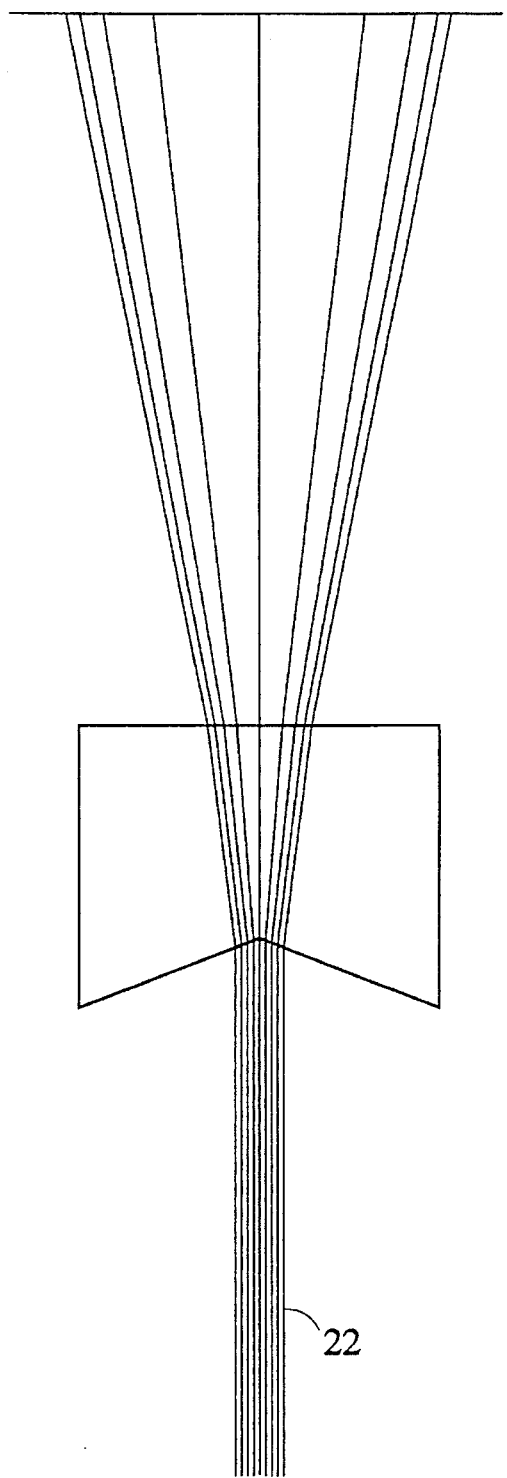
FIG. 5 shows an alternative embodiment of a segment of the lens of the invention used as a beam expander.

FIG. 5 shows an alternative embodiment of a single cylindrical segment of the optical element, or lens, of the invention, used as a laser beam expander. It shows the primary surface as a negative surface of the same curvature as the primary surface of FIG. 3. Quadrants such as these can be cemented at 90° to each other to produce a diverging cross. It can be seen that a laser beam is directed at the apex (the vertex in the actual lens) and becomes expanded to the greatest degree at the apex (centre of the beam) and to a smaller degree at the outside region of the beam.

Figure 6:
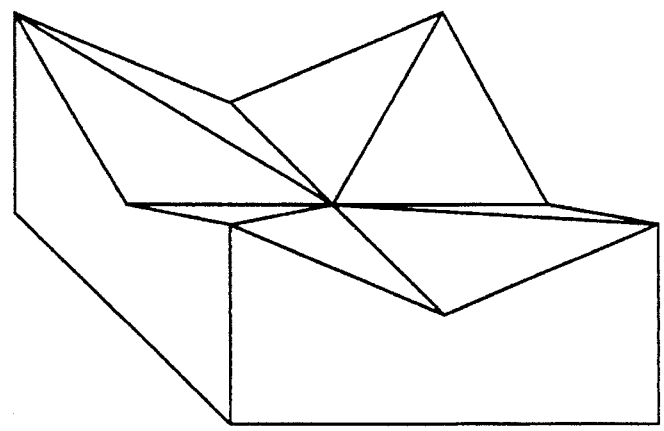
FIG. 6 is a view of a lens of the present invention employing the segments shown in FIG. 5.

An embodiment of the present invention employing the segments of FIG. 5 is shown in FIG. 6.

Figure 7:
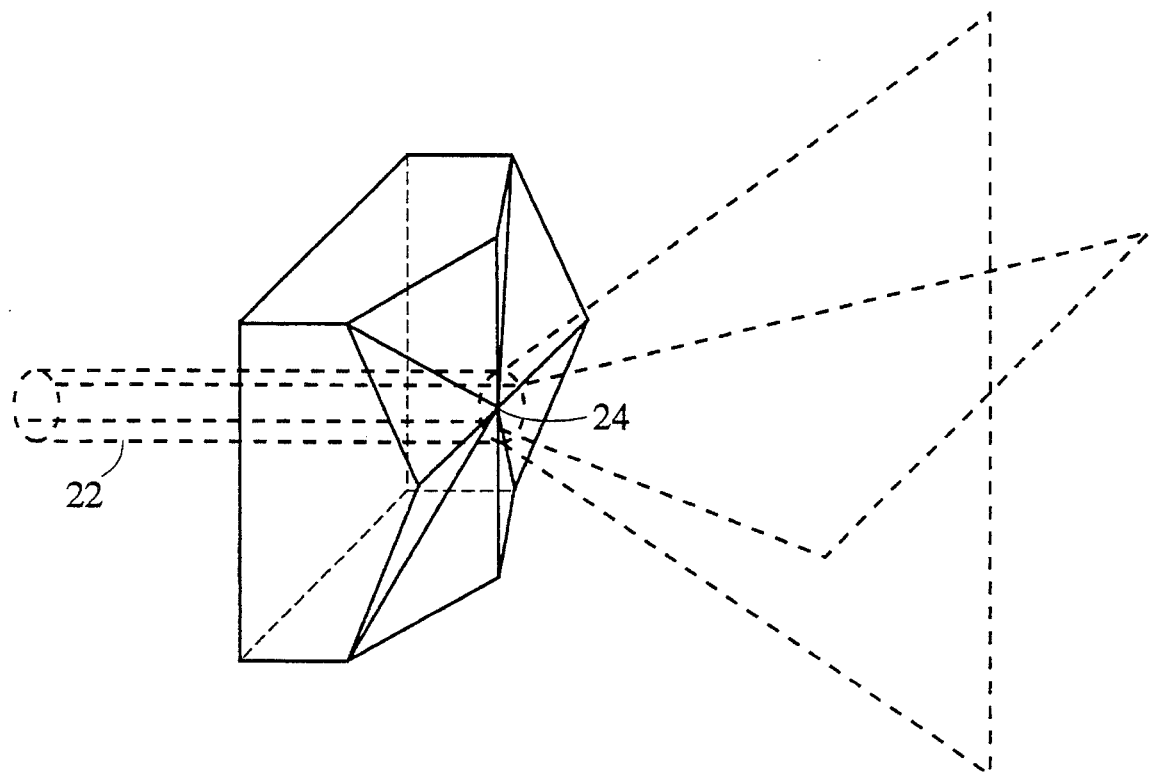
FIG. 7 illustrates a laser beam expander employing the optical element of the present invention.
Figure 8A:
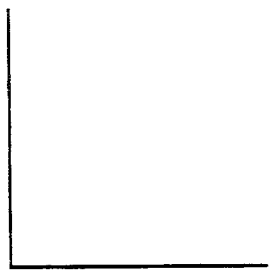
FIG. 8 illustrates schematically alternative shapes of the element of the invention.
Figure 8B:
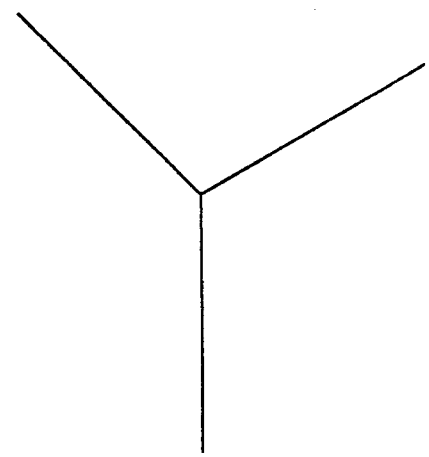
Figure 8C:
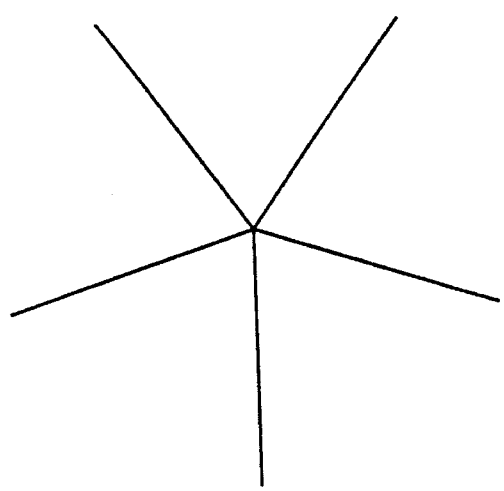
Figure 8D:
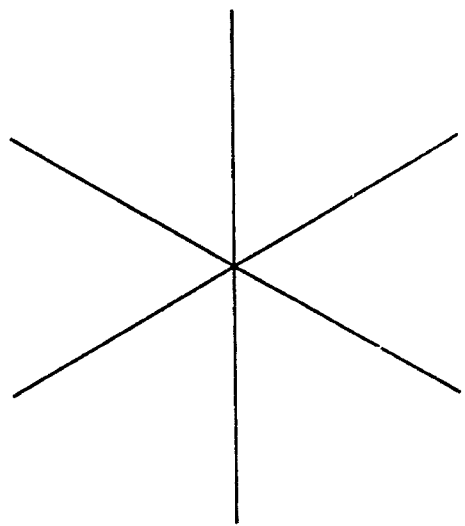

Either configuration can face the incoming beam or can be oriented to face in the opposite direction as shown in FIG. 7 which shows the optical element of the present invention used as a laser beam expander. The laser beam 22 is directed at the vertex 24 of the lens. It is preferable that the lens is positioned so that its plane is perpendicular to the incident laser beam.

With the primary surface facing the beam, it is possible to increase divergence by designing the secondary surface so that it is negatively cylindrical instead of planar.

In the embodiment of FIG. 3, the primary and the secondary surface of a segment are furthest from each other at the apex. In the embodiment of FIGS. 5 and 6, these surfaces are closest to each other at the apex. It is also conceivable to produce an element wherein segments of the above-defined two types are combined.

It is not necessary for the optical element to have a cross-shaped configuration i.e. consist of four segments distributed uniformly in a single plane. The number of segments which are indicated schematically as solid lines in FIG. 8, can be different, e.g., 2, 3, 5 or 6 as shown in FIG. 8. It is to be noted that the two-segment, V-arrangement shown in FIG. 8 constitutes a partly star-like arrangement. The uniformity of intensity of the expanded beams is not quite as good as with four segments, but is also acceptable. The number of segments is only limited by the manufacturing problems. Obviously, the more segments, the less intensity each expanded arm will have as the beam will be split into more parts. Also, it is not absolutely necessary that the axes of the segments be disposed at identical angles, i.e. 90° in a cross, 120° in the case of a tri-arm star, or 72° in the case of five segments ("arms"). It is important that the expanded beam arms do not blur each other. To avoid this problem, the cylindrical axes of opposite segments should be either exactly aligned, or sufficiently offset angularly.

Figure 9A:
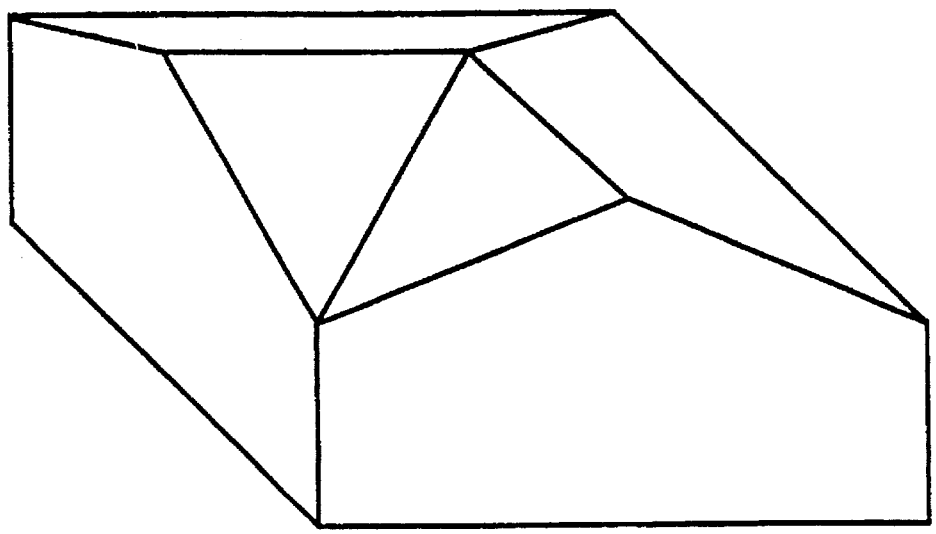
FIG. 9a is an oblique view of an optical element of the invention.
Figure 9B:
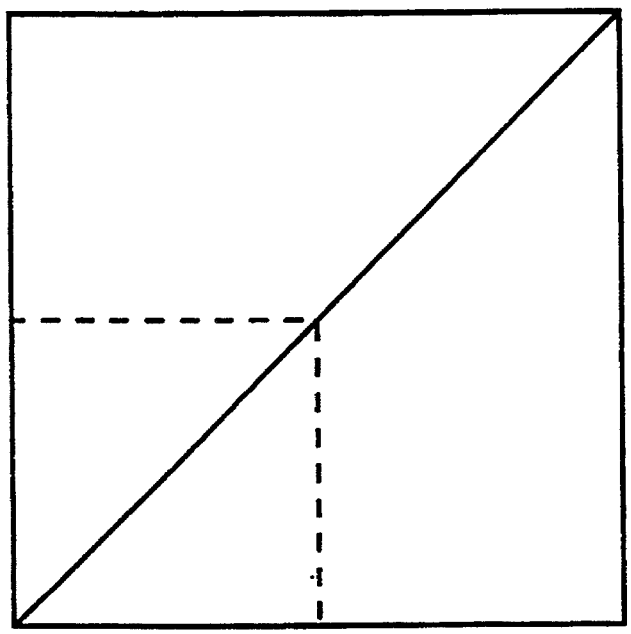

FIGS. 9a and 9b illustrate a V-shaped, or partly star-like lens consisting of two segments. The cylindrical axes of the segments, aligned with the apices, are shown with dotted lines in part b) of FIG. 9a.

Theoretically, the elements of the invention can be manufactured as monolithic blocks, particularly if a manufacturing process is available that affords a required surface precision. Practically, it is more feasible to produce separate segments and join them using e.g. an optical cement.

I claim:

1. An optical element comprising a plurality of cylindrical segments joined together so that the cylindrical axes of the cylindrical segments intersect to form a star-like, or partly star-like arrangement in a single plane, each segment having at least a primary surface and a secondary surface, the primary surface having a relatively sharp apex and being shaped to conform to a curve defined in a (x,y,z) cartesian coordinate system by the equation $$z = \frac{cy^2}{1 + \sqrt{1 - (1+Q)c^2y^2}}$$

where y and z are independent of x, c is the curvature at the apex and Q is the conic constant which is less than −1.

2. The optical element according to claim 1, wherein the secondary surface of each segment is selected from a group of shapes consisting of flat and negatively cylindrical.

3. The optical element according to claim 1, wherein the primary and the secondary surfaces of each segment are furthest from each other at the apex.

4. The optical lens according to claim 1, wherein the primary and the secondary surface of each segment are closest to each other at the apex.

5. A beam projector for expanding a laser beam into a uniform intensity star-like shape, comprising:

a laser beam source an optical element comprising a plurality of cylindrical segments joined together so that the cylindrical axes of the cylindrical segments intersect to form a star-like, or partly star-like arrangement in a single plane, each segment having at least a primary surface and a secondary surface, the primary surface having a relatively sharp apex and being shaped to conform to a curve defined in a (x,y,z) cartesian coordinate system by the equation $$z = \frac{cy^2}{1 + \sqrt{1 - (1+Q)c^2 y^2}}$$

the star-like arrangement defining a vertex at the intersection of the apices, the optical element being located relative to the laser beam source so that the vertex is in the laser beam.

6. The beam projector according to claim 5, wherein the secondary surface of each segment is selected from a group of shapes consisting of flat and negatively cylindrical.

7. The beam projector according to claim 5, wherein the primary and the secondary surfaces of each segment are furthest from each other at the apex.

8. The beam projector according to claim 5, wherein the primary and the secondary surface of each segment are closest to each other at the apex.

9. The beam projector according to claim 7, wherein the primary surfaces of the segments are oriented toward the source of the laser beam.

10. The beam projector according to claim 8, wherein the primary surfaces of the segments are oriented toward the source of the laser beam.

11. The beam projector according to claim 8, wherein the secondary surfaces of the segments are oriented toward the source of the laser beam.

12. The beam projector according to claim 8, wherein the secondary surfaces of the segments are oriented toward the source of the laser beam.

* * * * *